(12) United States Patent
Hawk et al.

(10) Patent No.: US 7,809,950 B2
(45) Date of Patent: Oct. 5, 2010

(54) SYSTEM AND METHOD FOR ACCESS TO A PASSWORD PROTECTED INFORMATION HANDLING SYSTEM

(75) Inventors: John Hawk, Austin, TX (US); James Dailey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 985 days.

(21) Appl. No.: 11/070,346

(22) Filed: Mar. 2, 2005

(65) Prior Publication Data

US 2006/0200679 A1 Sep. 7, 2006

(51) Int. Cl.
G06F 21/00 (2006.01)
G06F 7/04 (2006.01)
G06F 12/14 (2006.01)

(52) U.S. Cl. .......................... 713/182; 713/183; 726/16; 726/17

(58) Field of Classification Search .................. 726/2, 726/16–19
See application file for complete search history.

(56) References Cited

U.S. PATENT DOCUMENTS

| 5,012,514 | A |   | 4/1991  | Renton ............................ 380/4 |
| 5,375,243 | A |   | 12/1994 | Parzych et al. .............. 395/725 |
| 5,402,492 | A | * | 3/1995  | Goodman et al. ............. 726/20 |
| 5,537,544 | A | * | 7/1996  | Morisawa et al. ............. 726/19 |
| 5,581,700 | A | * | 12/1996 | Witte ........................... 726/19 |
| 6,012,146 | A |   | 1/2000  | Liebenow .................... 713/202 |
| 6,665,800 | B1 | * | 12/2003 | Jaber ........................... 726/19 |
| 6,725,382 | B1 | * | 4/2004  | Thompson et al. ............ 726/19 |
| 7,111,321 | B1 | * | 9/2006  | Watts et al. ..................... 726/2 |
| 7,210,166 | B2 | * | 4/2007  | Davis et al. ..................... 726/6 |
| 2003/0097585 | A1 |   | 5/2003 | Girard ........................ 713/200 |
| 2004/0153554 | A1 | * | 8/2004 | Kawakami .................. 709/229 |
| 2004/0250055 | A1 |   | 12/2004 | Flanigan ........................ 713/1 |
| 2005/0138399 | A1 | * | 6/2005 | Cheston et al. ............. 713/189 |

OTHER PUBLICATIONS

AMIBIOS8 Hard Disk Security, Version 1.1, Nov. 2002, pp. 1-8.*
Setup for AMIBIOS8, 2005, pp. 1-70.*

* cited by examiner

Primary Examiner—Benjamin E Lanier
(74) Attorney, Agent, or Firm—Hamilton & Terrile, LLP; Robert W. Holland

(57) ABSTRACT

Information handling system security is simplified and enhanced with user passwords configurable to restrict access to the overall system and separately to the hard disk drive. An administrative password overrides the BIOS password to allow administrative access to the information handling system. Upon creation of a hard disk drive password on a system having an administrative password, the hard disk drive password is saved to the hard disk drive and to the BIOS with access from the BIOS restricted by the administrative password. Upon entry of the administrative password at the BIOS, the hard disk drive password is automatically provided from the BIOS to the hard disk drive to allow access to the hard disk drive.

13 Claims, 3 Drawing Sheets

SYSTEM AND METHOD FOR ACCESS TO A PASSWORD PROTECTED INFORMATION HANDLING SYSTEM

BACKGROUND OF THE INVENTION

1. Field of the Invention

The present invention relates in general to the field of information handling system password protection, and more particularly to a system and method for access to a password protected information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One concern with the use of information handling systems is the security of information stored or processed by an information handling system. Businesses often have confidential and sensitive information, such as customer lists and identities, that are stored on information handling systems which, if compromised, could lead to business difficulties or customer complaints. Individuals typically maintain private and financial information, such as medical and financial records, that are stored on information handling systems which, if compromised, could lead to embarrassment of or theft from the individual. In order to secure information, businesses and individuals typically invest in a variety of security applications that prevent access by unauthorized users, such as network password protection and firewalls. A cat-and-mouse game is often played between information technology administrators seeking to protect information and hackers seeking to illicitly acquire information. Often, security measures taken to secure information impact legitimate users with delays or inconveniences in using the information. For instance, users are typically required to have a password to access a network. If a user forgets the password or compromises the password, a network administrator generally must get involved to allow the user access to the network, such as by retrieving or changing the password.

One security risk that presents a particular danger to information is the physical theft of an information handling system. Desktop systems are generally kept in a physically secure area that makes theft difficult, however, laptop or portable systems are often exposed in non-secure areas that make them vulnerable to theft. For instance, businesses often supply portable systems to employees who travel frequently. These portable systems are often configured to connect with the business' network through the Internet or through a cradle located in the employee's office. Thus, physical theft of a portable system can expose the entire business' network to attack by exposing security information that allows remote access to the network. Individuals also often use portable systems to store private information that is subject to disklosure if the system is stolen. In order to counter the risk of physical theft, portable systems are generally protected by one or more passwords. For instance, hard disk drives have both a user password and a master password to access information. The user selects the user password for daily use while the master password allows access if the user loses or forgets the user password. Similarly, the BIOS often has user and administrator password protection to limit access to the information handling system to an authorized user or administrator. In the event that a user forgets a password, information technology administrators need access to the administrator password of the BIOS and the master password of the hard disk drive to access the system. However, if the master password of the hard disk drive is changed from its manufacture setting, the manufacturer of the information handling system cannot aid in the retrieval of the lost password. The ATA specification defines only two passwords for a hard disk drive. Because the irretrievable loss of a hard disk drive password is the equivalent from the user's perspective of a hard disk drive failure and often leads to service calls or system returns that increase a manufacturer's cost, information handling system manufactures typically enable one password for the user and retain the other password as a failsafe to use in response to a loss of a user password.

SUMMARY OF THE INVENTION

Therefore a need has arisen for a system and method which manages password access to an information handling system in the event a user password is unavailable.

In accordance with the present invention, a system and method are provided which substantially reduce the disadvantages and problems associated with previous methods and systems for password protection of and access to an information handling system. User passwords associated with one or more physical components of an information handling system are stored in a predetermined physical component under the protection of an admin password so that input of the admin password allows access to the stored passwords from the predetermined physical component.

More specifically, a security module associated with the BIOS and hard disk drive of an information handling system coordinates the storage of a hard disk drive password on the BIOS with access restricted by an admin password. A user accesses the hard disk drive by inputting the hard disk drive password to the hard disk drive or by inputting the admin password to the BIOS. The security module determines whether to send the hard disk drive password from BIOS to unlock the hard disk drive based on the entry of the admin password to the BIOS. A separate BIOS password restricts access to the BIOS without releasing the hard disk drive password. In addition, a master password remains available on the hard disk drive, such as for use by the manufacturer as a failsafe in the event of loss of the user password. Thus, information technology administrators have a single admin password to access both the BIOS and the hard disk drive, the manufacturer remains able to unlock the hard disk drive, and the user may have distinct passwords to protect the BIOS and the hard disk drive. The integrity of the passwords is maintained by storing the hard disk drive password on the BIOS only if an admin password exists at creation of the hard disk drive password, by passing the hard disk drive password from the BIOS only in response to the input of the admin password, and by deleting the hard disk drive from the BIOS if the admin password is removed.

The present invention provides a number of important technical advantages. One example of an important technical advantage is that an information technology administrator retains centralized access to plural physical processing components by entry of a single admin password, which releases the passwords of the other physical processing components. The manufacturer of the information handling system retains the ability to unlock desired components, such as the hard disk drive, with a master password so that the loss of a user password will not result in a failure of an information handling system. Entry of the admin password automatically sends the user passwords to the components so that information technology administrators have a seamless and simple system and method for managing password protected information handling systems.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Access to password-protected components of an information handling system is aided by the secured storage of component passwords accessible by an administrative password. For purposes of this disklosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
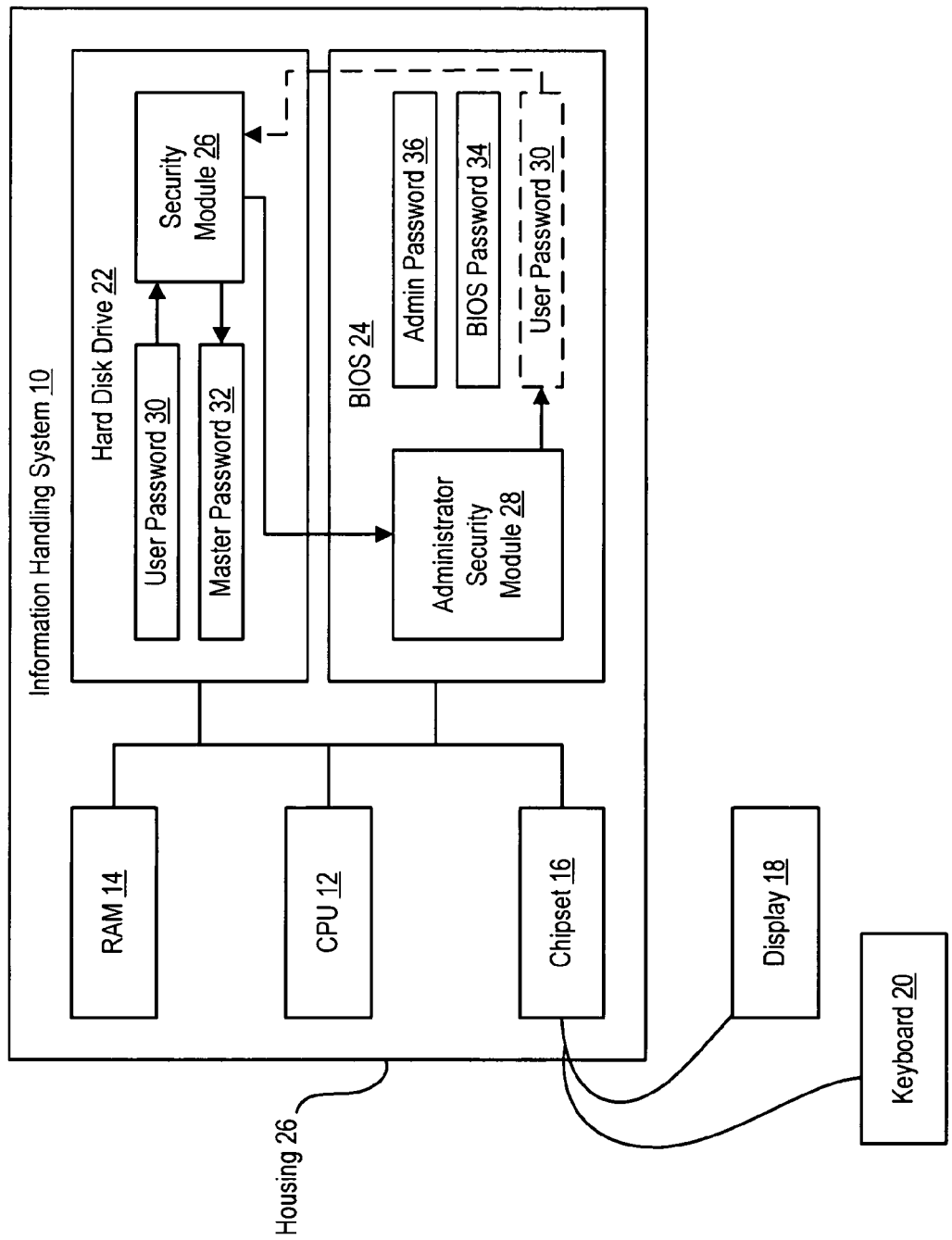
FIG. 1 depicts a block diagram of an information handling system having access protected by BIOS and hard disk drive passwords.

Referring now to FIG. 1, a block diagram depicts an information handling system 10 having access protected by BIOS and hard disk drive passwords. Information handling system 10 includes a number of physical processing components for processing information, such as a CPU 12 that performs instructions, RAM 14 that stores information, a chipset 16 that supports peripherals like a display 18 and keyboard 20, a hard disk drive 22 that permanently stores information and a BIOS 24 that coordinates the operation of the physical processing components. Software components, such as an operating system and associated drivers, support interactions between physical components and applications. The various processing components are integrated into a common housing, although portable systems typically allow removal of some components, such as hard disk drive 22.

In order to manage password security of information handling system 10, a hard disk drive security module 26 operates in firmware of hard disk drive 22 and an administrator security module 28 operates in firmware of BIOS 24. BIOS 24 allows a user to select a user password 30 to be stored in security module 26 that a user must input to access hard disk drive 22. When user password 30 is initially selected, BIOS 24 also creates a master password 32 which is saved in security module 26. User access to information on hard disk drive 22 is restricted absent the entry of user password 30, effectively preventing use of the system in the event that a user does not know the password. If user password 30 is lost or forgotten, the manufacturer of information handling system 10 recreates master password 32 to give to an authorized user and allow access to hard disk drive 22 by overriding user password 30, thus avoiding system failure. BIOS administrator security module 28 allows a user to set a BIOS password 34 and a system administrator to set an admin password 36. When BIOS password 34 is selected, BIOS administrator security module 28 restricts access to BIOS 24 unless the BIOS password is entered, thus securing information handling system 10 from an unauthorized boot. Admin password 36 overrides the restriction to BIOS use absent the BIOS password so that an administrator can always access BIOS 24 and boot information handling system 10, even if the user forgets or loses BIOS password 34.

Although an information technology administrator can secure access to BIOS 24 with admin password 36, information handling system 10 remains generally inaccessible unless the administrator also knows user password 30 or master password 32. To ensure administrator access to hard disk drive 22 without retrieving the master password from the manufacturer, hard disk drive security module 26 and BIOS administrator security module 28 cooperate to store user password 30 in a secure area of BIOS 24, such as with administrative password 36 and BIOS password 34. Upon input of admin password 36, administrative security module 28 automatically provides user password 30 to hard disk drive security module 26 to allow access to hard disk drive 22. Hard disk drive 22 remains inaccessible if BIOS password 34 is entered unless either user password 30 or master password 32 is entered, however, hard disk drive 22 is accessible at any time by entry of admin password 36. To ensure the integrity of the passwords, security modules 26 and 28 restrict the communication of user password 30 between hard disk drive 22 and BIOS 24. For instance, user password 30 is only stored on BIOS 24 if admin password 36 exists when user password 30 is created. User password 30 is only communicated from BIOS 24 to hard disk drive 22 if admin password 36 is entered. If admin password 36 is removed from BIOS 24, user password 30 is also deleted from BIOS 24 but remains on hard disk drive 22. Admin password 36 will only unlock a hard disk drive in a system on which the hard disk drive password is created, but master password 32 remains available from the manufacturer if needed.

Figure 2:
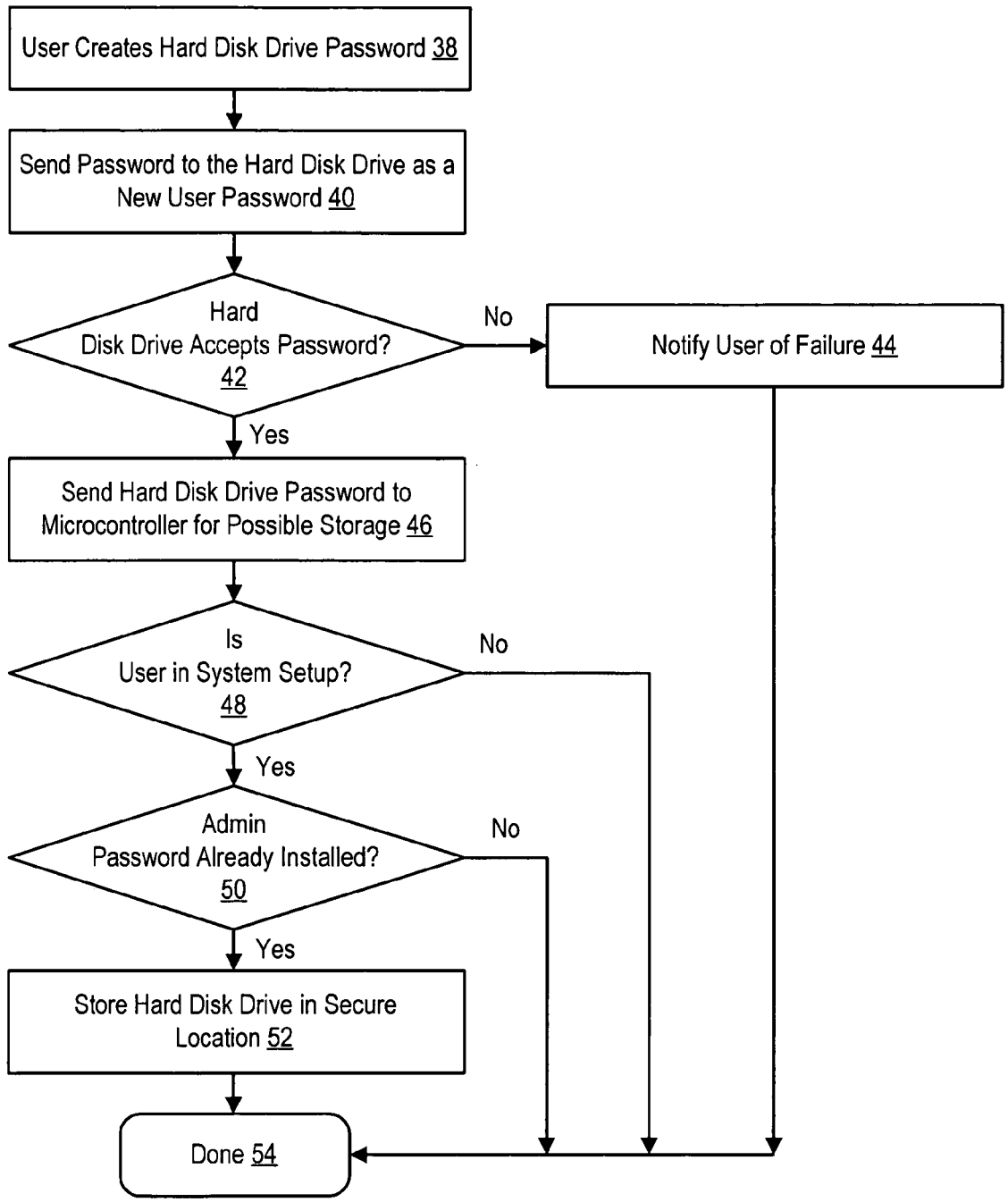
FIG. 2 depicts a flow diagram of a process for storing a hard disk drive password on a BIOS.

Referring now to FIG. 2, a flow diagram depicts a process for storing a hard disk drive password on a BIOS. The process begins at step 38 upon a user request through the BIOS to create the hard disk drive password and, at step 40, the password is sent to the hard disk drive as a new user password. At step 42, a determination is made of whether the hard disk drive accepts the password and, if not, at step 44 the user is notified of the failure. If the hard disk drive accepts the password at step 42, the process continues to step 46 at which the hard disk drive password is sent to the BIOS microcontroller for storage. At step 48, a determination is made of whether the user is in system setup and at step 50 a determination is made of whether an administrative password is already installed in the BIOS. If the determinations at steps 48 and 50 are no, the process ends without the storage of the hard disk drive password on the BIOS. If the determinations at both step 48 and step 50 are yes, the process continues to step 52 to store the hard disk drive password in a secure location of the BIOS and ends at step 54. The instructions for performing the storage of the hard disk drive password are distributed in BIOS and hard disk drive firmware or other secure portions of the information handling system.

Figure 3:
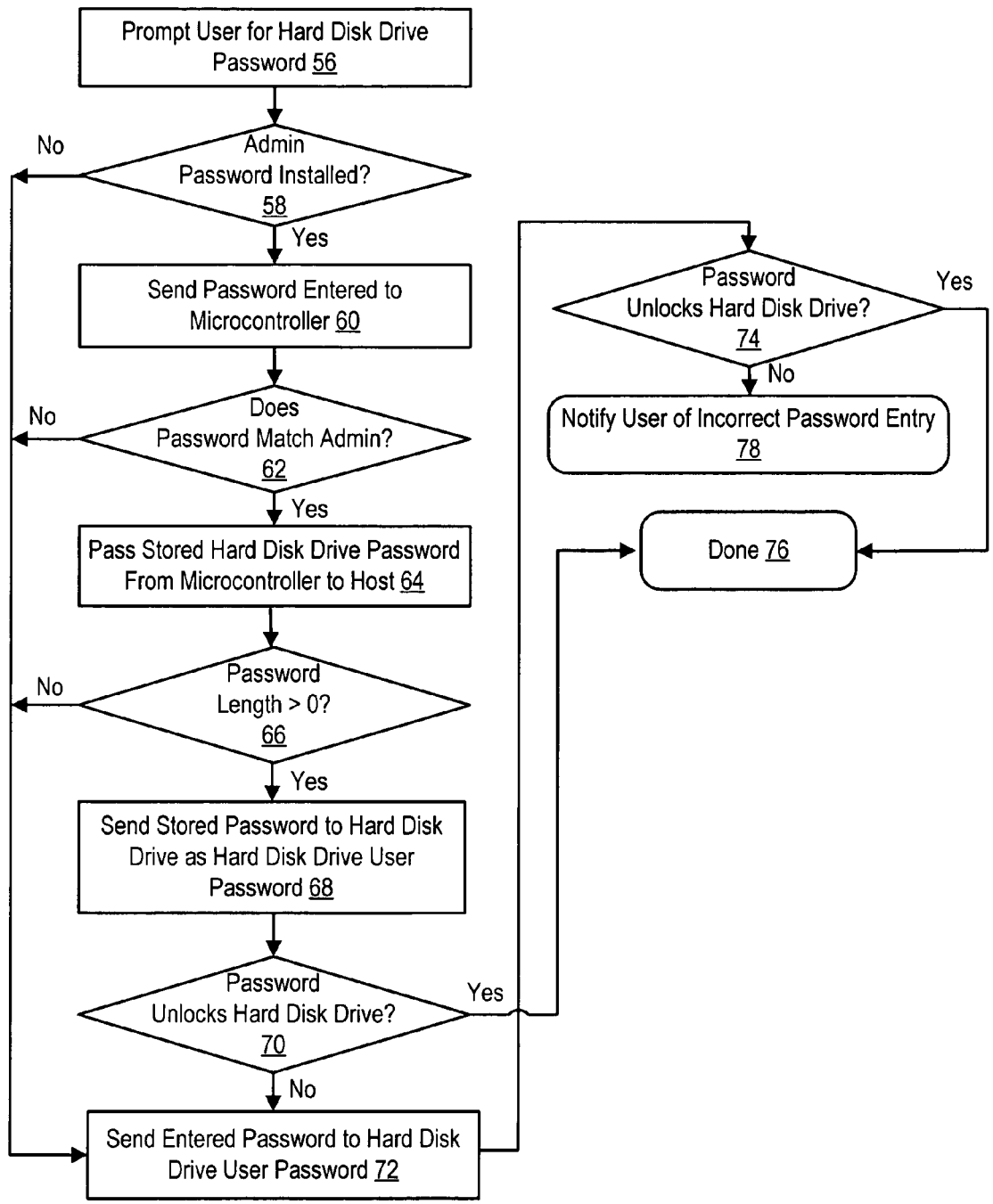
FIG. 3 depicts a flow diagram of a process for retrieving a hard disk drive password from a BIOS in response to an administrative password.

Referring now to FIG. 3, a flow diagram depicts a process for retrieving a hard disk drive password from a BIOS in response to an administrative password. The process begins at step 56 with a prompt initiated by the BIOS for the hard disk drive password. At step 58, a determination is made of whether an admin password is installed and, if not, the process continues to step 72 to send the password to the hard disk drive. If an admin password is installed, the process continues to step 60 to send the input password to the BIOS microcontroller for a determination at step 62 of whether the input password matches the admin password. If no match is found at step 62, the process continues to step 72, however if the input password matches the admin password, the process instead continues to step 64. At step 64, the hard disk drive password stored in the BIOS is provided to the information handling system for a length check at step 66 and then at step 68 provided to the hard disk drive as the hard disk drive password instead of the input password. At step 70 a determination is made of whether the hard disk drive is unlocked and, if so, at step 76 the process completes. If at step 70 the password from the BIOS does not unlock the hard disk drive, the process continues to step 72 to send the entered password to the hard disk drive. At step 74 a determination is made of whether the password unlocks the hard disk drive. If the hard disk drive is unlocked, the process completes at step 76 and, if not, the process completes at step 78 by notifying the user of the incorrect password.

Although the present invention has been described in detail, it should be understood that various changes, substitutions and alterations can be made hereto without departing from the spirit and scope of the invention as defined by the appended claims.

What is claimed is:

1. An information handling system comprising:
    plural processing components operable to process information;
    a first physical component of the plural processing components, the first physical component having access secured by a first user password and a master password;
    a second physical component of the plural processing components, the second physical component having access secured by a second user password and an administrative password; and
    a security module interfaced with the first and second components, the security module operable to retrieve the first user password from an input device and to store the first user password at the second physical component protected by the administrative password, the security module further operable to automatically allow access to the first physical component upon entry of the administrative password to the second physical component.

2. The information handling system of claim 1 wherein the first physical component comprises a hard disk drive.

3. The information handling system of claim 2 wherein the second physical component comprises a BIOS.

4. The information handling system of claim 3 wherein the hard disk drive master password is set to a manufacturer determined value.

5. The information handling system of claim 1 wherein the security module is further operable to:
    determine a user request to create the first user password;
    determine that the administrative password exists; and
    store the first user password at the second physical component if the administrative password exists.

6. The information handling system of claim 5 wherein the security module is further operable to prohibit transfer of the first user password from the second physical component except in response to the administrative password.

7. The information handling system of claim 6 wherein the security module is further operable to delete the first user password from the second physical component if the administrative password is deleted.

8. A method for password protection of an information handling system, the method comprising:
    storing an administrative password on a physical processing component integrated in the information handling system;
    receiving a user request to create a user password associated with a hard disk drive of the information handling system;
    creating the user password to restrict access to the hard disk drive absent entry of the user password;
    storing the user password on the physical processing component;
    restricting access to the user password stored on the physical processing component absent entry of the administrative password;
    detecting deletion of the administrative password from the physical processing component; and
    automatically deleting the user password from the physical processing component in response to the detecting deletion of the administrative password.

9. The method of claim 8 wherein the physical processing component comprises a BIOS.

10. The method of claim 8 further comprising:
    receiving the administrative password at the physical processing component; and
    automatically sending the user password to the hard disk drive to allow access to the hard disk drive.

11. The method of claim 8 further comprising storing a master password on the hard disk drive to allow access to the hard disk drive in lieu of entry of the user password.

12. The method of claim 8 further comprising:
    creating a second user password to restrict access to the physical processing component; and
    restricting access to the user password associated with the hard disk drive on the physical processing component in response to the second user password.

13. The method of claim 8 wherein the information handling system is a portable system.

* * * * *